United States Patent [19]
Stone et al.

[11] Patent Number: 5,613,091
[45] Date of Patent: Mar. 18, 1997

[54] DATA COMPRESSION

[75] Inventors: Jonathan J. Stone, Mortimer; Terence R. Hurley, St Brides Major, both of United Kingdom

[73] Assignees: Sony Corporation, Tokyo, Japan; Sony United Kingdom Limited, Weybridge, England

[21] Appl. No.: 141,609

[22] Filed: Oct. 27, 1993

[30]  Foreign Application Priority Data

Dec. 22, 1992 [GB]  United Kingdom .................... 9226698

[51] Int. Cl.$^6$ ....................................................... G06F 15/00
[52] U.S. Cl. ................ 395/500; 364/260.6; 364/260.81; 364/262.4
[58] Field of Search ................................ 395/500; 382/56

[56]   References Cited

U.S. PATENT DOCUMENTS

| | | | |
|---|---|---|---|
| 5,136,371 | 8/1992 | Savatier et al. . | |
| 5,166,987 | 11/1992 | Kageyama | 382/56 |
| 5,168,375 | 12/1992 | Reisch et al. | 358/432 |
| 5,255,186 | 10/1993 | Steinhaus et al. | 364/413.06 |
| 5,294,925 | 3/1994 | Akagiri | 341/50 |
| 5,373,290 | 12/1994 | Lempel et al. | 341/51 |

FOREIGN PATENT DOCUMENTS

| | | |
|---|---|---|
| 1488863 | 10/1977 | United Kingdom . |
| 2251756 | 7/1992 | United Kingdom . |

*Primary Examiner*—Kevin J. Teska
*Assistant Examiner*—Ayni Mohamed
*Attorney, Agent, or Firm*—William S. Frommer; Alvin Sinderbrand

[57]   ABSTRACT

A signal processing system includes a compression encoder 16 for compressing an input block of data samples including a plurality of sub-blocks, each sub-block including an array of data samples, into a block of compressed data. A sequencer 14' accesses the data samples of the input block to be passed to the compression encoder 16 with the sub-blocks being accessed in a predetermined first order and the data samples within each sub-block being accessed in a predetermined pseudo-random order such that successively accessed locations in the array of samples for a sub-block are scattered throughout that sub-block. The pseudo random accessing sequence enables occupancy of a buffer 73 for the compressed data block to be linearised. The sequencer can include a counter 62, the output of which addresses a look-up table 65 for generating the pseudo-random sequence in a repeatable manner.

22 Claims, 10 Drawing Sheets

| 68 | 64 | 84 | 127 | 208 | 358 | 638 | 1163 |
| 64 | 72 | 96 | 144 | 233 | 396 | 697 | 1260 |
| 84 | 96 | 126 | 184 | 290 | 481 | 831 | 1457 |
| 127 | 144 | 184 | 260 | 396 | 637 | 1069 | 1856 |
| 208 | 233 | 290 | 396 | 581 | 904 | 1474 | 2491 |
| 356 | 396 | 481 | 637 | 904 | 1362 | 2153 | 3537 |
| 638 | 697 | 831 | 1067 | 1474 | 2153 | 3301 | 5272 |
| 1163 | 1260 | 1475 | 68 | 68 | 3537 | 5272 | 8192 |

| | 2 | 5 | 10 | 16 | 23 | 34 | 44 |
|---|---|---|---|---|---|---|---|
| 1 | 3 | 7 | 12 | 18 | 27 | 36 | 46 |
| 4 | 6 | 8 | 14 | 21 | 29 | 38 | 51 |
| 9 | 11 | 13 | 19 | 26 | 32 | 42 | 52 |
| 15 | 17 | 20 | 25 | 30 | 40 | 49 | 55 |
| 22 | 24 | 28 | 31 | 39 | 47 | 54 | 58 |
| 33 | 35 | 37 | 41 | 48 | 48 | 56 | 60 |
| 43 | 45 | 50 | | | 57 | 59 | 61 |

DATA COMPRESSION

BACKGROUND OF THE INVENTION

1. Field of the Invention

This invention relates to the field of data compression. More particularly, this invention relates to the field of data compression of the type in which blocks of input data are compressed into blocks of compressed data.

2. Description of the Prior Art

In some known data compression systems a quantiser is used to selectively remove information from the data as part of the compression process. A higher degree of quantisation will produce a higher degree of compression. In general, it is not possible to determine in advance what degree of compression will be produced by a particular degree of quantisation, since different portions of the input data may vary in information content and suitability for compression.

In some systems this is not a problem. For example, in a data compression system proposed by the Joint Photographic Experts Group image data is compressed using a quantiser and entropy encoder to a degree that varies upon the particular image and parameters used. The compressed image data is intended for non-real time processing and display, and accordingly, variations in the degree of compression achieved do not cause particular problems.

In another known data compression system input data is compressed with a quantiser and entropy encoder to effect temporal compression for the purpose of serial transmission. A data buffer is used to provide some time averaging of the degree of compression achieved. Compressed data is both continuously added to and removed from the buffer. If the buffer becomes too empty, or too full, then the degree of quantisation applied by the quantiser is changed to change the average rate of data flow into the buffer.

In contrast to the above, the problem of variation in the degree of compression achieved is particularly serious when compressing input data into blocks of a predetermined maximum size. The predetermined maximum size of the blocks of compressed data may be the result of the need to store each block of compressed data in a solid state memory or on magnetic tracks of fixed maximum capacity or the need to use the block of compressed data in a real-time transmission system with fixed maximum times for the processing of each block of compressed data. In such situations there is no flexibility in the maximum size of blocks of compressed data that can be accommodated. If too much compressed data is produced to fit into the fixed size block then an overrun with a consequential uncontrolled loss of data will occur.

To guard against this, the system can be set to have a degree of quantisation sufficient to ensure that all but the most information dense and difficult blocks of input data will compress to within the fixed size blocks.

Whilst the above solution is safe, it has the disadvantage that for most blocks of input data too high a level of quantisation is applied and more information is lost from the block of input data than was in fact necessary to fit the compressed data into its fixed size.

It is a constant aim of data compression systems to provide the degree of compression necessary for a given use with as low a loss in information from the input signal as is possible.

In co-pending UK patent application GB 9119985.1, filed on 19 September 1991 by the present applicant, there are described various examples of a data compression apparatus for compressing blocks of input data into blocks of compressed data having a predetermined maximum size, which data compression apparatus comprise a quantiser for applying a dynamically variable degree of quantisation to the blocks of input data to control the size of the blocks of compressed data to be substantially equal to the predetermined maximum size.

Header information which indicates the degree of quantisation applied is included in the blocks of compressed data so that on subsequent decompression the correct degree of dequantisation can subsequently be applied to the blocks of compressed data.

The apparatus described in GB 9119985.1 recognises that the variation in the degree of compression achieved with blocks of input data in general undergoes relatively small changes between adjacent blocks. For example, if the blocks of input data are successive fields of a video picture, then the changes in the scene depicted by the video field, and the information content of the video field, are relatively slow. In many other applications there are also relatively slowly changing information contents between blocks. Observation of different data streams will frequently show long runs of data sharing either high or low information content, e.g. long runs of zeros or low values followed by bursts of values of high information content. The apparatus described in GB 9119985.1 exploits this property by the application of dynamic control to the degree of quantisation applied to the input data. Dynamic control of the degree of quantisation reduces the average amount of information lost from the input data due to compression whilst guarding against overruns in the sizes of the blocks of compressed data.

The relationship between the degree of quantisation and the degree of compression is not a simple one and varies significantly on a number of factors including the information content of the block of input data being compressed. Various ways of achieving dynamic control of the degree of quantisation are described in GB 9119985.1.

In one approach an inter-block quantisation controller (i.e. a block quantisation controller which controls compression between blocks) uses a compression bit counter for storing a count of bits within blocks of compressed data. This is used to determine at the end of the compression of a block of input data what degree of quantisation the quantiser should apply to the next block of input data to control the size of the next block of compressed data to be substantially equal to the predetermined maximum size. The interblock quantisation controller determines a difference between the count of bits stored by the compressed bit counter and the predetermined maximum size and uses this difference to reference a memory storing data mapping differences to corresponding changes in degree of quantisation for reducing each difference value to substantially zero.

An alternative approach for dealing with this relationship is one in which the inter-block quantisation controller uses the count of bits stored by a compressed bit counter and a value indicating the current degree of quantisation to reference from a memory one of a plurality of sets of data which map degree of quantisation against degree of compression, and reads from the set of data what degree of quantisation the quantiser should apply to the block of input data to control the size of the block of compressed data to be substantially equal to said predetermined maximum size.

GB 9119985.1 explains that the degree of quantisation determined by the inter-block quantisation controller can be simply fed back to the quantiser for application to a subsequent block of input data. Other examples are also described where, for situations where a more exact inter-block control is required and in which time delay is not a critical problem, the inter-block quantisation controller also includes a test quantiser for applying a test degree of quantisation to each block of input data. The compressed bit counter is arranged to measure the degree of compression achieved with the test degree of quantisation. A delay circuit is provided For delaying arrival of said block of input data at the quantiser until the degree of quantisation determined by the inter-block quantisation controller is available for application by the quantiser to that block of input data.

GB 9119985.1 also describes another example in which the risk of overrun occurring can be further reduced by providing a desired occupancy indicator indicating the number of bits quantised in each block of input data and an intra-block quantisation controller (i.e. a quantisation controller fop dynamically varying the degree of quantisation within a block) which is responsive to the desired occupancy indicator. A compressed bit counter is used to determine what degree of quantisation the quantiser should apply to subsequent bits within the block of input data to control the size of the blocks of compressed data to be substantially equal to the predetermined maximum size. The quantiser applies said degree of quantisation determined by the intra-block quantisation controller to the subsequent bits within the block of input data.

The intra-block quantisation can be used in conjunction with inter-block quantisation. GB 9119985.1 describes an example where an accumulator stores a value indicative of the average degree of quantisation applied to a current block of input data, and a latch for reading the accumulator at the end of compression of each block of input data and serving as source of a base degree of quantisation to be applied to a subsequent block of input data.

The dynamic intra-block control described in co-pending application GB 9119985.1 works well in most situations. However, a problem has been identified where the block of data to be compressed has a degree of detail over the block which is not homogeneous. Consider, for example, the situation where the block of data to be compressed represents an image with relatively less image detail in the upper half (e.g. the sky) and relatively more detail in the lower half (e.g. the foreground). In such a situation, it has been found that the inter-block quantisation controller tends to apply a higher level of quantisation in the upper half of an image than is desirable and a lower level of quantisation in the lower part of the image than is desirable with the result that detail is lost in the lower part of the image.

SUMMARY OF THE INVENTION

In accordance with a first aspect of the invention, there is provided a signal processing system comprising data compression means for compressing an input block of data samples comprising a plurality of sub-blocks, each sub-block including an array of data samples, into a block of compressed data, and sequencing means for accessing the data samples of the input block to be passed to the compression means with the sub-blocks being accessed in a predetermined first order and the data samples within each sub-block being accessed in a predetermined pseudo-random order such that successively accessed locations in the array of samples for a sub-block are scattered throughout that sub-block.

The scattering of successive samples throughout a sub-block enables a quantisation factor to be employed throughout a block which is closer to the ideal than would otherwise be possible without prior knowledge of the information density of the data samples of the input block. Accordingly, it enables the occupancy of a buffer memory for the compressed data block during writing to the buffer to be linearised.

The sequencing means can be arranged to perform inter-sub-band scanning by sequentially accessing the sub-blocks in the first order a number of passes equal to the number of data samples per sub-block and with one data sample per sub-block being selected on each pass, the location of the data sample selected from each sub-block on successive passes being determined in accordance with the pseudo-random order. Alternatively, the sequencing means can be arranged to perform intra-sub-block scanning by sequentially accessing the sub-blocks in the first order with all the data samples of a sub-block being selected in accordance with the pseudo-random order before the next sub-block is accessed in accordance with the first order.

Preferably, the sequencing means comprises a counter for generating N successive counts, where N is the number of data samples per sub-block, and mapping means defining a mapping for successive counts in accordance with the pseudo-random order for accessing data samples within a sub-block. This provides a readily implementable randomisation of the accessing of the data samples of a sub-block.

For inter-sub-band scanning the sequencing means can be arranged to sequentially access the sub-blocks in the first order a number of passes equal to the number of data samples per sub-block with the count of the counter being incremented once per pass. For intra-sub-band scanning the sequencing means can be arranged to sequentially access the sub-blocks in the first order with the counter being incremented N times per sub-block.

Preferably, the mapping means is a look-up table, the input to which is connected to the output of the counter, whereby the count output from the counter addresses a location in the look-up table defining the sub-block data sample location corresponding to the position within the pseudo-random order.

Automatic intra-sub-block adjustment of the quantisation factor can be achieved by means of a quantiser for applying a dynamically variable degree of quantisation to a block of input data samples to control the size of the block of compressed data to be substantially equal to a predetermined size.

Where storage means is used for storing a block of compressed data, a compressed bit counter can be provided for counting the bits written to the storage means for a block of compressed data. For controlling the quantiser, there are preferably provided a desired occupancy indicator for providing an indication of a number of bits quantised for each input block and a quantisation controller which is responsive to the desired occupancy indicator and the compressed bit counter for determining what degree of quantisation the quantiser should apply to subsequent bits of the input block to control the size of the blocks of compressed data to be substantially equal to the predetermined size, the quantiser applying the degree of quantisation determined by the quantisation controller to the subsequent bits of the input block.

An accumulator can be provided for storing a value indicative of the average degree of quantisation applied to a current input block with means for reading the accumulator at the end of compression of each input block and serving as source of a base degree of quantisation to be applied to a subsequent input block.

Preferably, means are provided for generating a header for a block of compressed data, the header including information defining the base degree of quantisation applied for that block.

It will be appreciated that the invention is applicable to different sorts of data compression systems. However, the invention is particularly suited to embodiments in which said data compression apparatus is operable with input data which is image input data. As noted above the variation of information content between adjacent blocks of input data is relatively small making dynamic control of the level of quantisation particularly effective. Accordingly, the invention finds particular, but not exclusive application to the processing of video images, whereby the input block can be an input image.

Again, the invention is applicable to different sorts of image input data compression systems, but is particularly suited to embodiments further comprising a decorrelator for frequency separating said image input data in the two-dimensional spatial frequency domain into frequency component data. The frequency separation may be carried out using techniques such as discrete cosine transformation or sub-band filtering. In such embodiments the relationship between the compressed data and the image data is complex, with certain portions of the compressed data having a particularly large influence upon the quality of image that can be reproduced. In these circumstances it is particularly important to control any losses of data that may occur due to overrun.

Accordingly, the invention also provides an image processing system comprising a data processing system as defined above wherein the input block is a decorrelated input image, each sub-block comprising a decorrelated sub-image, the image processing system comprising means for decorrelating an input image to generate the decorrelated image comprising a plurality of decorrelated sub-images.

In accordance with a second aspect of the invention, there is provided a signal processing system comprising data decompression means for decompressing a block of compressed data samples to form an output block of data samples which comprises a plurality of sub-blocks, each sub-block including an array of data samples, and resequencing means for addressing storage locations for storage of the data samples from the decompression means with the sub-blocks being addressed in a predetermined first order and the data samples within each sub-block being addressed in a predetermined pseudo-random order such that successively addressed locations in the array of samples for a sub-block are scattered throughout that sub-block.

DESCRIPTION OF THE PREFERRED EMBODIMENTS

Figure 1:
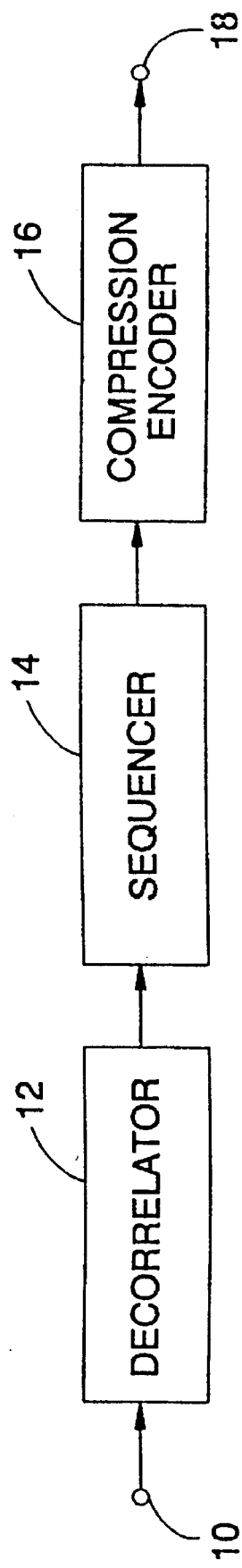
FIG. 1 is a schematic illustration of a data compression system.

FIG. 1 is a schematic block diagram giving an overview of a compression processing apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is fed by the decorrelator 12 via data sequencer 14 to a compression encoder 16, which compresses the frequency separated video signal provided by the decorrelator 12 to produce a compressed signal on an output 18. The compressed signal can then be transmitted or stored, as required by the particular application.

Figure 2:
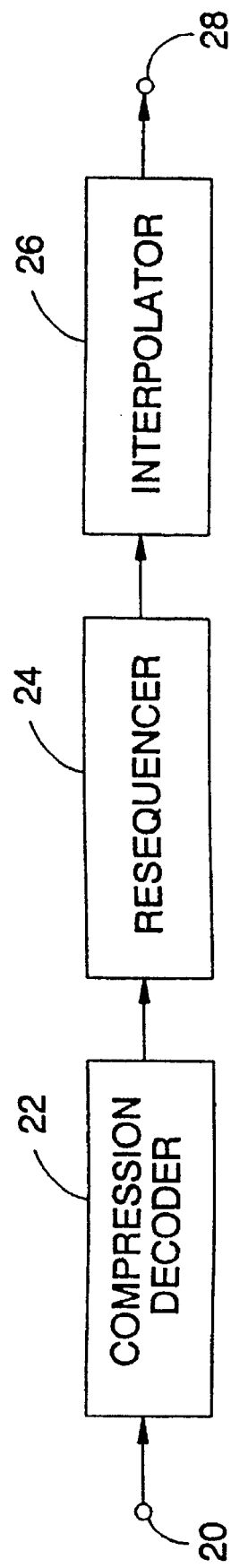
FIG. 2 is a schematic illustration of a complementary data decompression system.

FIG. 2 is a schematic block diagram giving an overview of a decompression processing apparatus for decompressing the compressed signal after transmission or storage. The compressed signal can be restored substantially to its original form by expansion by way of compression decoding, resequencing, and interpolation operations. The compressed signal is input at 20 to a compression decoder 22 and is then passed via a resequencer 24 to an interpolator 26, which outputs the restored video signal at 28. The steps of compression decoding, resequencing, and interpolation employ parameters converse to those used for decorrelation, sequencing, and compression encoding, respectively, upon compression.

The structure and operation of the various elements of the compression processing apparatus of FIG. 1 will now be described in more detail.

The decorrelation operation performed by the decorrelator 12 relies on the fact that neighbouring pixels of an image are highly correlated, whereby processing an image (for example a field or frame of a video signal) to form frequency separated signal portions representing different components of the image in the two dimensional spatial frequency domain enables a reduction in the amount of information needed to represent the image. Specifically, the frequency separated signal portions represent different spatial frequency components of the image.

Various decorrelation techniques could be used for the decorrelator 12. One suitable form of decorrelation would be so called transform coding, in particular the discrete cosine transform. The use of discrete cosine transform for decorrelation is prescribed in a version of a compression system described in a standard proposed by the Joint Photographic Experts Group. According to the transform technique of decorrelation, the signal is subjected to a linear transform (decorrelation) operation prior to quantisation and encoding.

In the present example, however, an approach to decorrelation based on sub-band coding is used. Accordingly, the decorrelator 20 in the apparatus of FIG. 1 comprises a spatial (2-dimensional) sub-band filtering arrangement which divides the input video signal into a plurality of uncorrelated sub-bands each containing the spatial frequency of the content of the image in respect of one of a plurality of areas of a two-dimensional frequency plane of the image. Decorrelation is achieved by putting the energy of the overall image into different sub-bands of a two-dimensional spatial frequency domain. Sub-band filtering is believed to provide better decorrelation than the transform approach.

Figure 3:
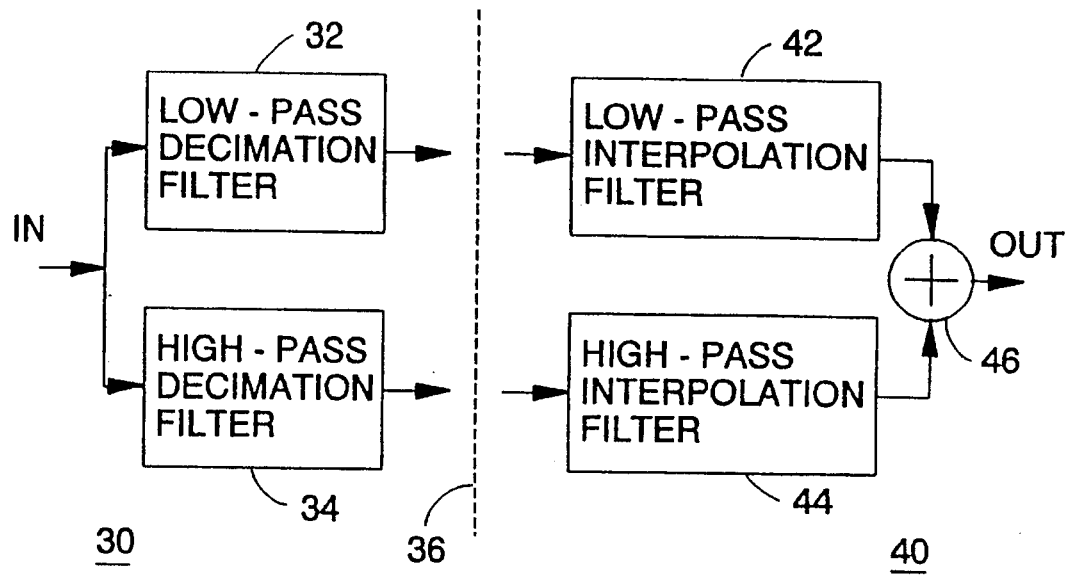
FIG. 3 is a schematic illustration of a simple sub-band coding system.

FIG. 3 illustrates the principle of sub-band coding in which an input video signal is passed at IN through a low-pass decimation filter 32 and a high-pass decimation filter 34 of a decorrelator 30. The resulting two output signals represent different portions of the frequency spectrum of the input signal. The two signals can then be processed further for storage or transmission as indicated by the dashed line 36 in FIG. 4. When the sub-band components are recovered from storage or after transmission they are passed through corresponding matching filters in an interpolator 40 to regenerate the original frequency components. These matching filters are a low-pass interpolation filter 42 and a high-pass interpolation filter 44. The outputs of the interpolation filters 42, 44 are added by a summation circuit 46 to yield the original video input signal at OUT. FIG. 3 illustrates the decomposition of the input video signal into two sub-bands. In practice, the input video signal would be decomposed into many more sub-band components.

Figure 4:
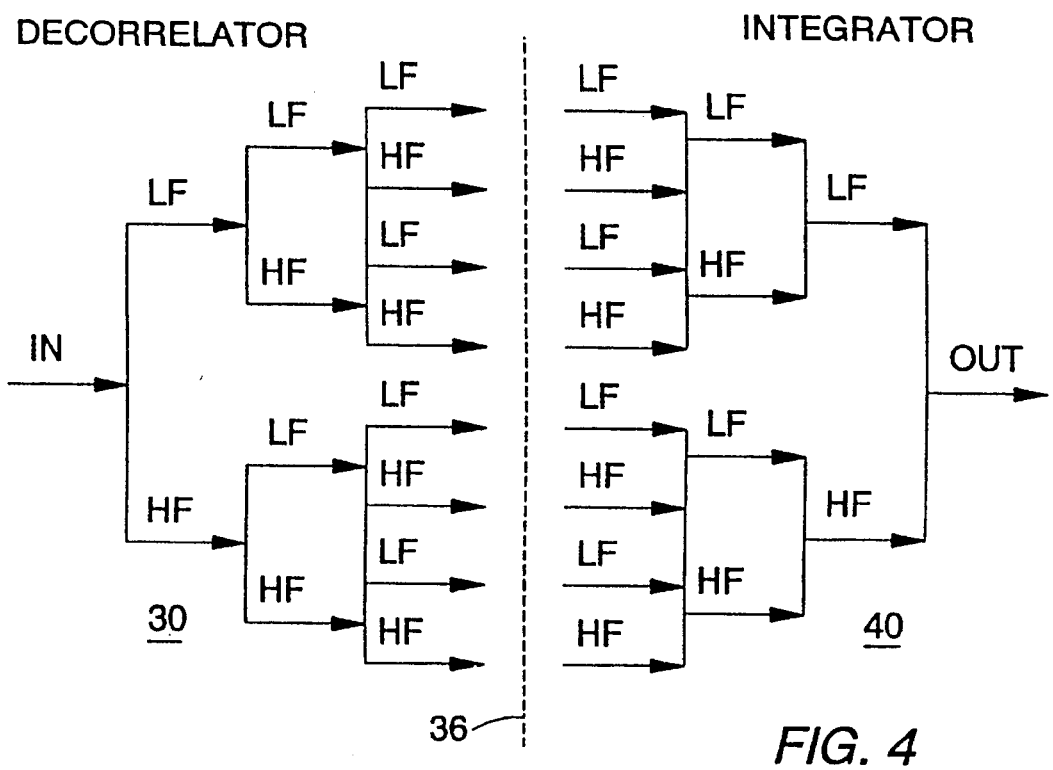
FIG. 4 is a schematic illustration of a higher order sub-band coding system.

FIG. 4 illustrates the decomposition of an input signal into eight sub-band components in a decorrelator 30 and its subsequent recombination into an output video signal in an interpolator 40. LF indicates a low-pass decimation or interpolation filter (as appropriate left or right, respectively, of the dashed line 36) and HF indicates a high-pass decimation or interpolation filter (as appropriate left or right, respectively, of the dashed line 36).

Figures 5, 11:
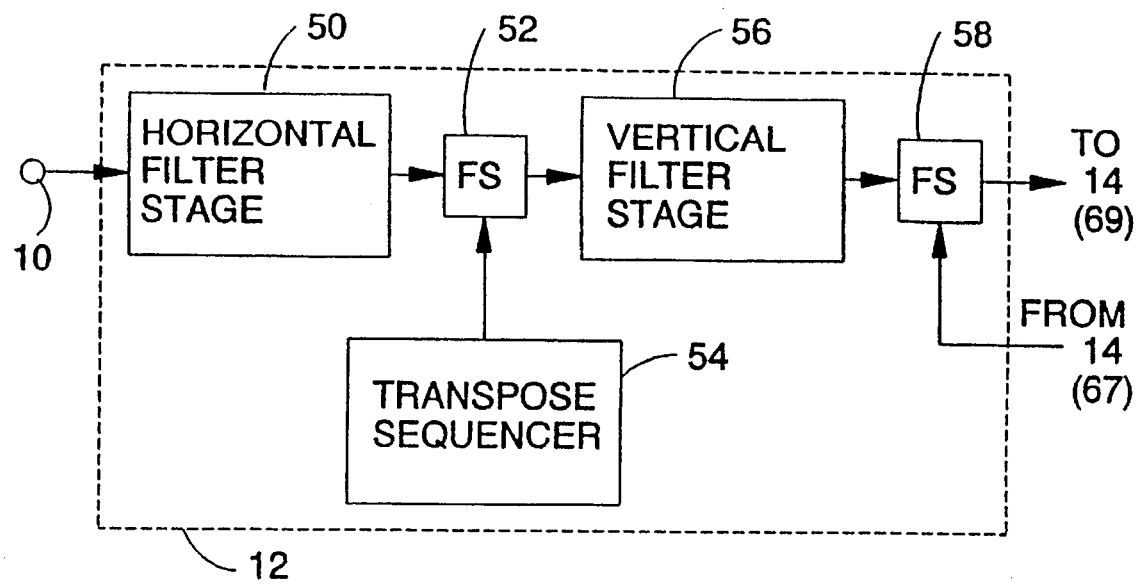
FIG. 5 illustrates a two-dimensional sub-band decorrelator.
FIG. 11 is a quantisation matrix.

FIG. 5 illustrates an example of a conventional decorrelator 12 for processing the image samples. The decorrelator comprises a horizontal filter stage 50, an intermediate field store 52, a transpose sequencer (address generator) 54, a vertical filter stage 56 and an output field store 58. Sub-band filtering is effected on a separable basis. Thus, in FIG. 5, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 50 and 56, respectively.

The horizontal filter arrangement 50 and vertical filter arrangement 56 can be of substantially the same construction as one another, that is a tree or hierarchical structure as shown on the left side of the dashed line 36 in FIG. 4, comprising three successive filter stages. There follows a brief description of the operation of the decorrelator 12.

In operation, the horizontal filter stage 50 processes the pixels of an input video field line-by-line and, within each line, pixel by pixel. Successive lines of data output by the eight outputs of third stage of the horizontal filter stage 50 are passed to the intermediate field store 52 and are stored at positions corresponding to respective one-eighths of those lines. This results in the intermediate field store 52 containing a version of the field of the input digital video signal that has been filtered into eight sub-bands in the horizontal direction (only). Each line of the field stored in the intermediate field store 52 is divided into eight portions each containing the horizontal spatial frequency information in a respective one of eight sub-bands of the horizontal spatial frequency range of the image that the original field represented. Thus, the horizontally filtered field stored in the intermediate field store 52 can be considered to be divided into eight columns.

The horizontally filtered field stored in the intermediate field store 52 is then fed (under the control of the transpose sequencer 54) into the vertical filter stage 56, in which it is filtered into eight sub-bands in the vertical direction in similar manner to that in which filtering into eight sub-bands in the horizontal direction was achieved in the horizontal filter stage 50. The horizontally and vertically filtered field is fed on a line-by-line basis into the output field store 58. The store 58 can be considered to have been partitioned into an array of 64 (8×8) storage regions, in each of which a respective one of the 64 sub-bands is stored. The data relating to each of the sub-bands is referred to as a sub-picture, or sub-image. Thus, there are 64 sub-pictures or sub-images for each field of input video.

Figures 6, 7:
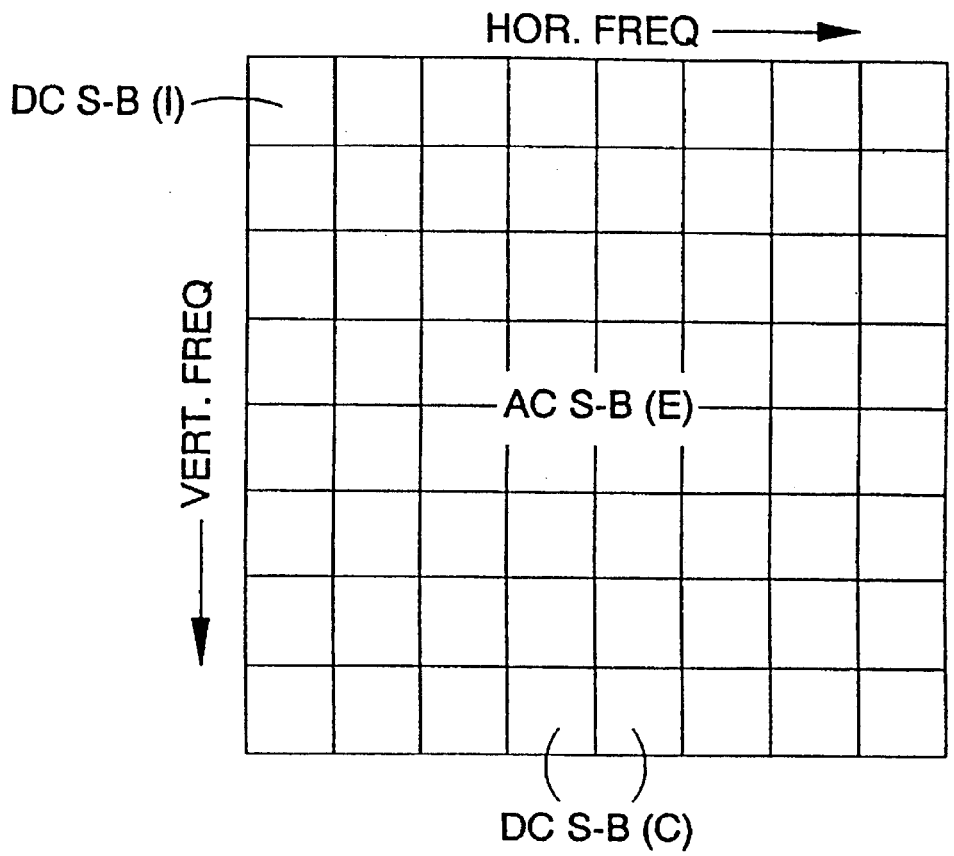
FIG. 6 illustrates a frequency separated video signal.
FIG. 7 illustrates the order of sub-band scanning of the AC spatial frequency components.

FIG. 6 represents the array of 64 sub-pictures for the respective sub-bands. The arrows to the top and the left of the array represent, respectively, the direction of increasing frequency of the sub-bands as a result of the repeated decimation by the pairs of low and high frequency filters. In this example, "DC S-B(I)" represents a DC sub-band which has the lowest horizontal and vertical frequency, which contains the majority of the DC luminance information of the original input video signal. The frequency which a particular one of the AC sub-bands represents ("AC S-B(E)" relates to AC sub-bands which contain edge data) increases in moving downwards and rightwards within the array of blocks. DC chrominance information is, in this example which applies to NTSC format video signals, contained in the sub-bands labelled "DC S-B(C)".

The nature of the filtering produced by the combination of the horizontal and vertical filter stages 50 and 56 is such that data stored in the output field store 58 is somewhat scrambled as a result of the frequency inversion which takes place in each pair of low- and high-pass filters. The data sequencer 14 "de-scrambles" (i.e. re-orders) the data before being passed for further processing by selective addressing of the field store 58.

FIG. 7 illustrates the order of scanning of the AC spatial frequency components sub-bands. Thus the sub-bands are accessed in the order 1, 2, 3, 4, and so on. However, the accessing of the individual samples within the sub-bands also needs to be controlled.

Figure 8:
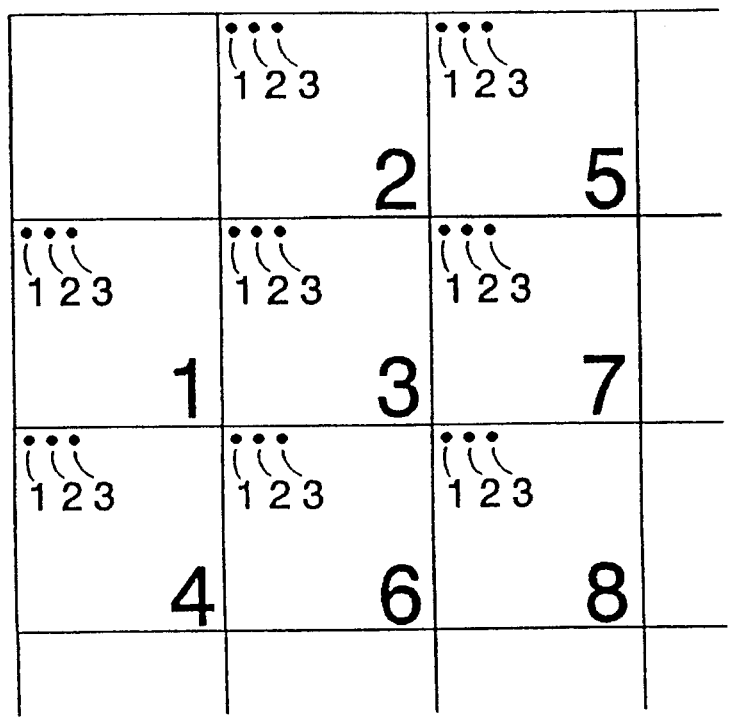
FIG. 8 illustrates in more detail the order of scanning samples as previously proposed within the AC spatial frequency sub-band components of FIG. 7.

FIG. 8 illustrates in more detail the order of scanning samples as previously proposed for the scanning of the AC spatial frequency sub-band components of FIG. 7 in, for example, the apparatus described in co-pending UK application GB 9119985.1. The DC luminance information and DC chrominance information sub-bands are intra-sub-band scanned and fed to the entropy encoder 16 of FIG. 1. The data from the remaining sub-bands is inter-sub-band scanned out to the compression encoder 16 in the order shown in FIG. 7 (i.e. in order of increasing AC spatial frequency). In other words, the basic scanning pattern of FIG. 7 is performed in a plurality of passes, with a sample being accessed on each pass, whereby a plurality of N passes equal to the number of samples N per sub-band in necessary in order to access all samples.

Inter-sub-band scanning as previously proposed involves, in a first pass, accessing the top left sample labelled with a small "1" in each sub-band in the order represented by the larger numerals 1, 2, 3, 4, etc. In a second pass, the next sample to the right identified by a small "2" in each sub-band is accessed, in the order represented by the larger numerals 1, 2, 3, 4, etc. In a third pass the next sample to the right identified by a small "3" in each sub-band is accessed in the same order. This process continues with each of the samples on the first row in each sub-band being accessed followed by each sample in the second, third, and further rows within each sub-band until all the samples have been accessed.

It has also been proposed to access all the samples of one sub-band before the samples from the next sub-band are accessed. This will be termed intra-sub-band scanning. With reference once more to FIG. 8, this would mean that the samples in the first sub-band identified by the large "1" would be accessed before those of the sub-band identified by the large "2", the sub-band identified by the large "3", and so on. For each sub-band the samples are accessed row by row, and within each row, column by column, as represented by the first three samples of the first row of each sub-band identified by the small numerals 1, 2, 3.

However, in both inter- and intra-sub-band scanning as previously proposed the samples of a sub-band are accessed in a systematic manner from top to bottom which can be equated to a conventional raster type of scanning pattern. Such a scanning pattern has been employed because it is easy to implement and because it corresponds to the conventional manner of accessing video data.

Figure 9:
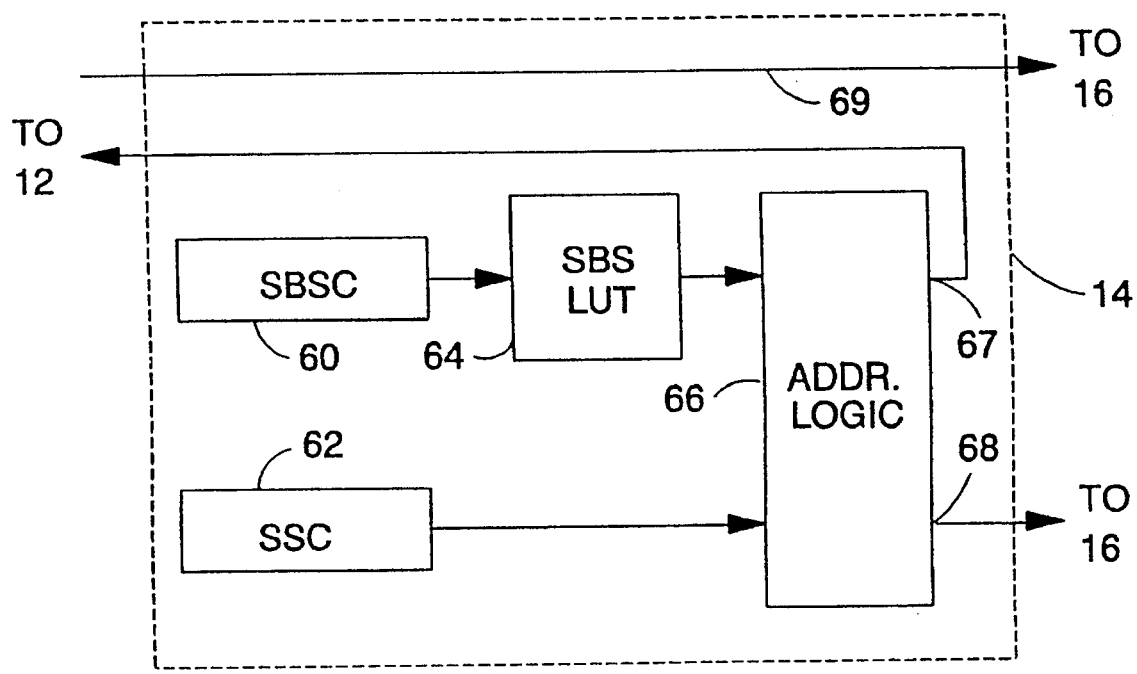
FIG. 9 is a schematic illustration of a sequencer for scanning the AC spatial frequency components as shown in FIG. 8.

FIG. 9 is a schematic block diagram of a possible logical structure for a sequencer 14 for carrying out inter-sub-band or intra-sub-band scanning as previously proposed. The sequencer 14 illustrated in FIG. 9 comprises first and second counters 60 and 62. A sub-band scan counter (SBSC) 60 is used to control the scanning of the sub-bands in the order illustrated in FIG. 7. The output of the counter 60 is used to address a sub-band scan look-up table (SBS LUT) 64 in successive storage locations of which the identity of successive sub-bands in the order illustrated in FIG. 7 are stored. The successive sub-band identifiers are passed to address logic 66. A sample scan counter (SSC) 62 generates successive counts For sequencing through the samples of a sub-band. The output of the SSC 60 is also supplied to the address logic 66. The address logic 66 uses the outputs of the SBS LUT 64 and the SSC 62 to map logical sub-band and sample addresses as represented by the outputs of the SBS LUT 64 and the SSC 62, respectively, into physical addresses for addressing the samples in the field store 58 of the decorrelator 12 to extract the sample data in the appropriate order. The mapping may be performed by means of look-up tables in the address logic 66.

If inter-sub-band scanning is employed, then the SBSC 60 is incremented by a scanning clock (not shown) once pep sample to be accessed, with the SSC being incremented once pep pass (i.e. after the SBSC has been incremented a number of times equal to the number of AC sub-bands). If intra-sub-band is employed then the SSC 62 is incremented by a scanning clock (not shown) once pep sample to be accessed with the SBSC 60 being incremented once per sub-band (i.e. after the SSC has been incremented by a number of times equal to the number of samples pep sub-band).

The data accessed by the sequencer is passed, in time multiplexed manner, via path 69 to the compression encoder 16 For further processing. The sequencer also supplies signals at an output 68 to the compression encoder 16 indicating the sub-picture or sub-band to which each sample currently output from the output field store 58 relates.

Figure 10:
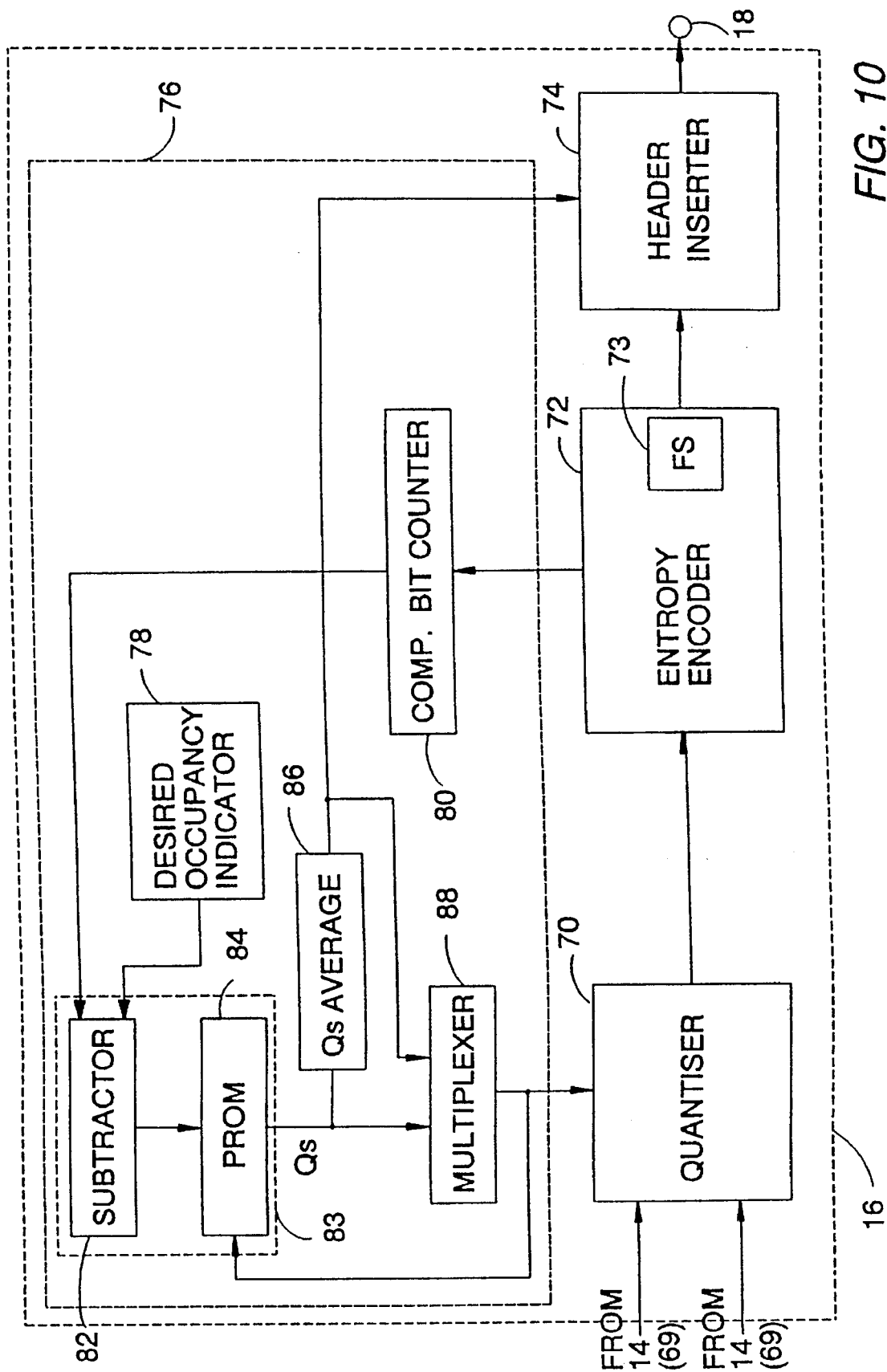
FIG. 10 is a schematic block diagram of a compression encoder for effecting both inter-block and intra-block dynamic control of the degree of quantisation.

FIG. 10 is a schematic block diagram of an example of a compression encoder 16 which includes a quantiser 70, an entropy encoder 72 and a header inserter 74. FIG. 11 also illustrates components of a quantisation controller 76 which can provide both intra-block and inter-block control of the degree of quantisation provided by the quantiser 70.

The basic flow of data is through the quantiser 70 to the entropy encoder 72, which includes a field store 73 fop storing the compressed data prior to final Formatting by means of the header inserter 74 fop storage or data transmission from the output 18.

The data within the field store 73 resulting from a complete set of 64 sub-bands is deemed to comprise one block of compressed data with a predetermined maximum size. These blocks of compressed data may then be recorded as individual tracks on a magnetic tape for subsequent recovery and decompression, or could be stored within a RAM recorder for subsequent real-time recovery, decompression and broadcast transmission. It will be understood that the blocks of compressed data could also be handled in many other different manners before decompression.

The quantisation operation performed by the quantiser 70 is a lossy operation in that it involves deliberate discarding of some frequency data considered to be redundant or of little importance to adequate perception of the image by the human psychovisual system and, in itself, enables some signal compression to be achieved. The quantiser 70 enables compression to be achieved in two ways: it reduces the number of levels to which the data input to it can be assigned, and it increases the probability of runs of zero value samples on the data it outputs. The ability to achieve enhanced signal compression provided by the operation of the quantiser is carried into effect in the entropy encoder 72 in that the reduction in information content achieved in the quantiser 70 enables a consequential bit (data) rate reduction to be achieved in the entropy encoder.

Further (non-lossy) compression, and bit (data) rate reduction, is provided in the entropy encoder 72. The entropy encoder can be implemented, in known manner, using, for example, a combination of run-length encoding and Huffman encoding. Thus the data produced by the quantiser 14 is encoded in such a manner that more probable (more frequently occurring) items of data produce shorter output bit sequences than less probable (less frequently occurring) ones. In this regard, it is to be noted that the decorrelation operation can have the effect of changing the probability distribution of the occurrence of any particular signal level, which is substantially the same as between the different possible levels before decorrelation, into a form in which it is much more probable that certain levels will occur than others.

FIG. 11 shows a quantisation matrix that can be applied to the differing sub-pictures, or sub-bands, of FIG. 6 by the quantiser 70. The way in which the quantiser operates is that each value within each sub-band is divided by a corresponding quantisation value and then the integer value of the result is taken. The quantisation value used is determined by the factor provided by an entry in a quantisation matrix and a quantisation scaling factor ($Q_s$) that will be discussed in more detail below. For the moment it is assumed that $Q_s=1$. Thus, if a value of 30 was read from the DC luminance sub-band in the top left hand corner, this would be divided by the corresponding quantisation value of 68 and the integer value taken giving a quantised result of zero. Similarly, if a value of 80 were read from the DC luminance sub-band and divided by 68, the resulting integer value would be one.

It Will be seen that the lowest quantisation values occur in the bands immediately below and to the right of the DC luminance sub-band. This is because the human visual system is most responsive to these sub-bands. The values for the quantisation matrix can be determined by a process of trial and error with subjective viewing tests to see which values gives the best perceived image.

The quantisation matrix of FIG. 11 is stored in a look-up table (not shown) in the quantiser 70. The individual quantisation value for a particular sub-band is accessed by the quantiser using the sub-band identifier for each sample output at 68 from the addressing logic 66 of the sequencer 14. Thus, the degree of quantisation applied to each sub-band varies under control of the quantisation matrix.

The degree of quantisation is further varied in dependence upon the quantisation scale factor ($Q_s$). The value of the quantisation scale factor $Q_s$ is used to select one of a plurality of quantisation matrices (not shown) in the quantiser 70, each of which contains 64 quantisation values for the respective sub-bands. The higher the quantisation scale factor, the higher are the quantisation values in the corresponding quantisation matrix. In the preferred embodiment the quantisation scale factor varies between 0 and 1023 (i.e. there are 1024 quantisation matrices). Thus, if $Q_s$ is high, then the overall degree of quantisation is increased, the degree of compression is increased and the resulting block of compressed data will be smaller. If $Q_s$ is low, then the overall degree of quantisation is decreased, the degree of compression is decreased and the resulting block of compressed data will be larger.

The quantisation control logic 76 dynamically varies the quantisation scale factor $Q_s$. The quantisation scale factor could be varied continuously, however it is preferably varied a predetermined number of times (e.g. 32 times) within a block.

A desired occupancy indicator 78 generates a linearly increasing value modelling what should be the correct average filling rate of the field store 73. A compressed bit counter 80 counts the number of bits fed to the field store 73 for a current block of data (i.e. for a current image) in response to data from the entropy encoder 72. In other words, the compressed bit counter 80 measures the current size of the block of compressed data during the compression of a block of data comprising the 64 sub-bands. The outputs of the desired occupancy indicator 78 and a compressed bit counter 80 are fed to a subtracter 82 throughout the compression of each block of data. The subtracter 82 produces an output equal to the value of the compressed bit counter 80 minus the output of the desired occupancy indicator 78. During the compression, the subtracter 82 indicates whether, for the data processed so far, the required degree of compression has been achieved. If the output from the subtracter 82 is positive then the amount of compressed data is too large.

The output from the subtracter 82 is fed to a PROM 84. The PROM determines what correction should be applied within the current block of data to the value of $Q_s$ to result in a final compressed block of a size substantially equal to the predetermined maximum size. The PROM 84 includes a look-up table mapping error against correction value. The PROM 84 is also fed with the current value of $Q_s$ from which the appropriate value for the rest of the block of data can be determined. The subtracter 82 and the PROM 84 together form a scale factor $Q_s$ generator 83.

The output from the PROM 84 is also fed to an averaging unit 86 which accumulates a value equal to the average quantisation value applied over that block of data. The header insert unit 74 reads the averaging unit 86 after processing a block of data to determine what value it should write within the header data for the next block of data.

It will be appreciated that when decompressing a block of compressed data that has had a variable degree of quantisation applied to it, the decompression apparatus should know what degree of quantisation was in fact applied to that block of data. To this end, the header inserter responds to the $Q_s$ average data to form header data for the compressed block of data. This enables a decompression apparatus to read from the header data what quantisation scaling factor was applied to a block of compressed data, this then being used as a base quantisation factor $Q_s$ for decompressing that block.

The outputs from the PROM 84 and the averaging unit 86 pass through multiplexer 88 to the quantiser 70. The multiplexer 88 selects the value accumulated in the averaging unit 86 for the start of compression of each block and then passes control to the output from the PROM 84. It will be seen that the quantiser 70 applies a degree of quantisation that not only dynamically varies between blocks of data, but dynamically varies within blocks of data.

Figure 12:
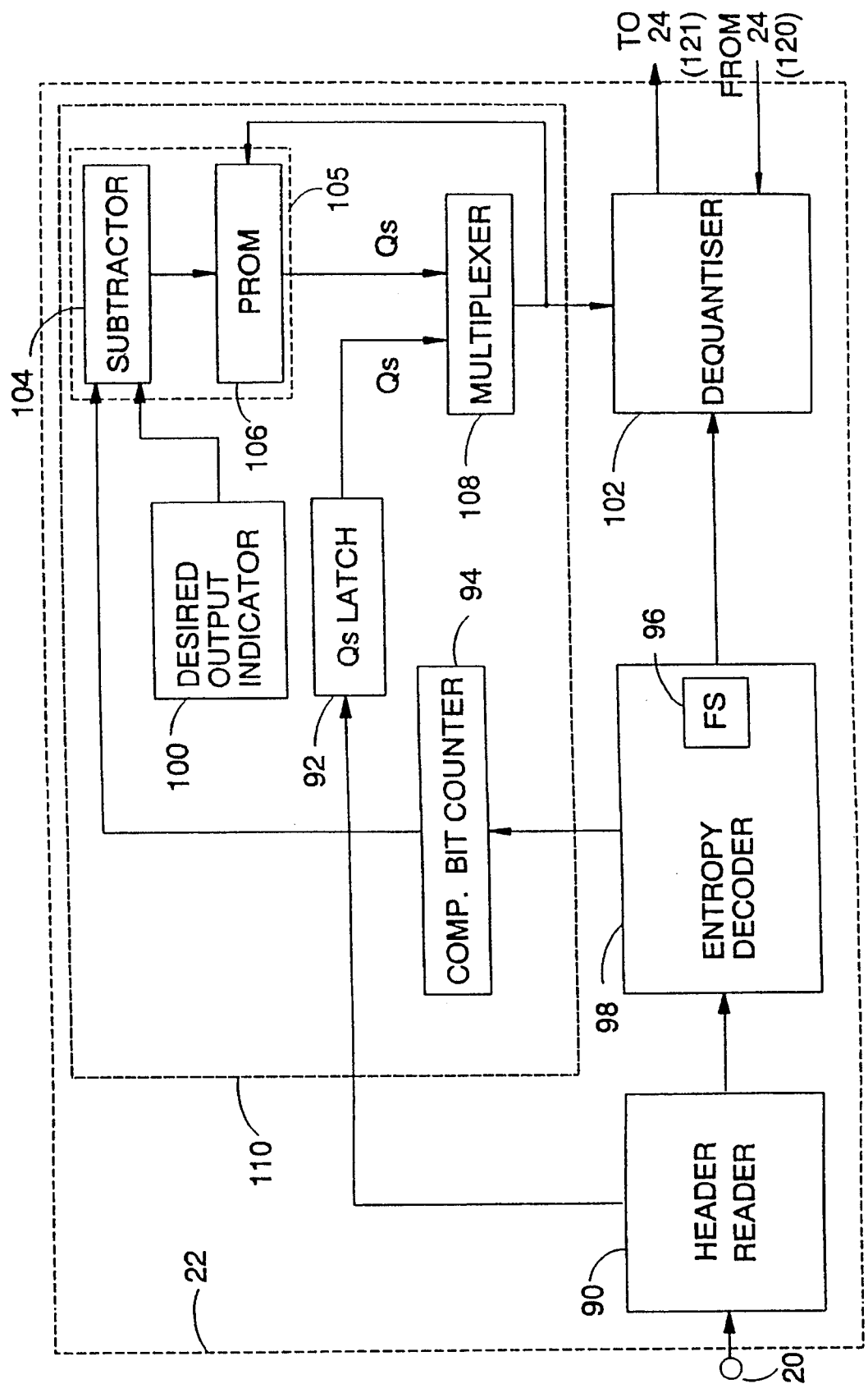
FIG. 12 is a schematic block diagram of a compression decoder for effecting both inter-block and intra-block dynamic control of the degree of quantisation.

FIG. 12 illustrates a complementary compression decoder 22 for use in the decompressing apparatus of FIG. 2 for decompressing data compressed by the compression encoder of FIG. 10. The compression decoder 22 includes a header reader 90, an entropy decoder 98, which includes a field store 96, a dequantiser 102 and a dequantiser controller 110.

In the compression decoder, a header reader 90 recovers the average $Q_s$ value for the block of data being decompressed and passes this to a $Q_s$ latch 92 for storage. A compressed bit counter 94 counts the bits read from a field store 96 of an entropy decoder 98. A desired output indicator 100 produces an output modelling the linear increase in the count of bits output which should ideally be generated from a dequantiser 102. The values output from the compressed bit counter 94 and the desired output indicator 100 are fed to a subtracter 104 throughout decompression of each block of data.

Figure 13:
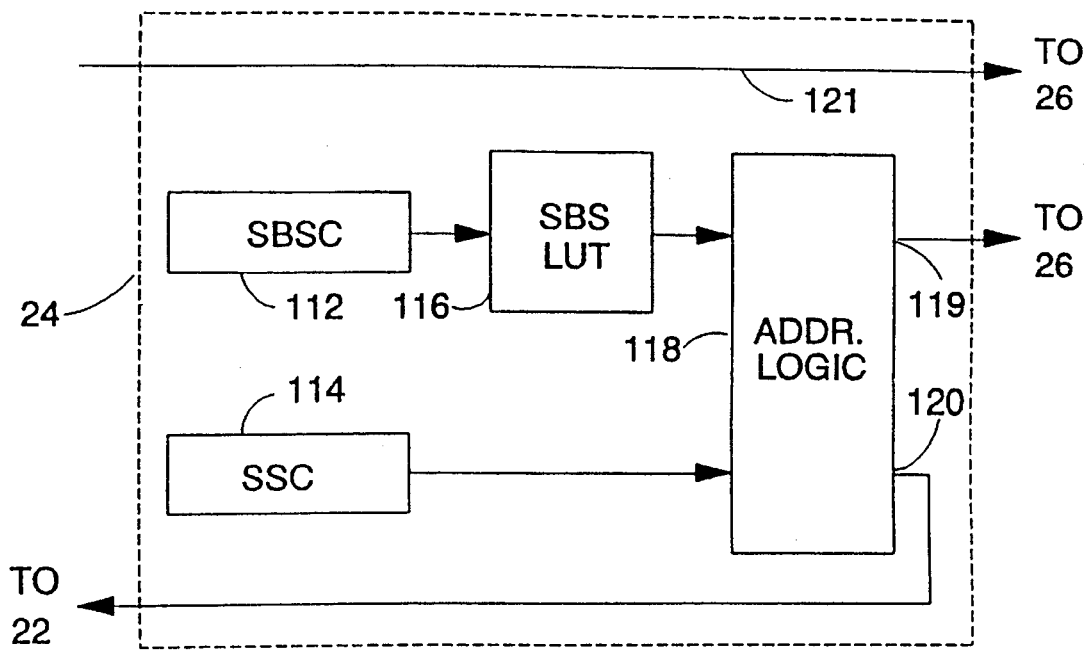
FIG. 13 is a schematic illustration of resequencer complementary to the sequencer of FIG. 9.

The subtracter 104 uses these inputs to determine if the required degree of dequantisation necessary to produce an output block of data having the appropriate size is currently being applied. This can be determined by subtracting the values. An error value thus generated together with the current quantisation value is used to produce a corrected value of $Q_s$. A corrected value is produced the same number of times per block (e.g. 32) as in the compression encoder. A multiplexer 108 selects the latched value for the start of the block and the output from a PROM 106 for the remainder. The subtracter 104 and the PROM 106 together form a corrected $Q_s$ value generator 105. The $Q_s$ value is used to select an appropriate dequantisation matrix (not shown) in the dequantiser 22. Individual dequantisation values within that matrix are selected for respective sub-bands in response to signals supplied from an output 120 from a resequencer 24 (FIG. 13).

The deviations in the achieved degree of compression from the desired degree of compression that occurred within the data compression apparatus will be mirrored in the decompression apparatus. Accordingly, the quantisation value used to compress the data can be regenerated on an intra-block basis during decompression. In this way, the degree of dequantisation applied by the dequantiser 102 is able to track the intra-block variation in the degree of quantisation applied by the quantiser 70.

Figure 14:
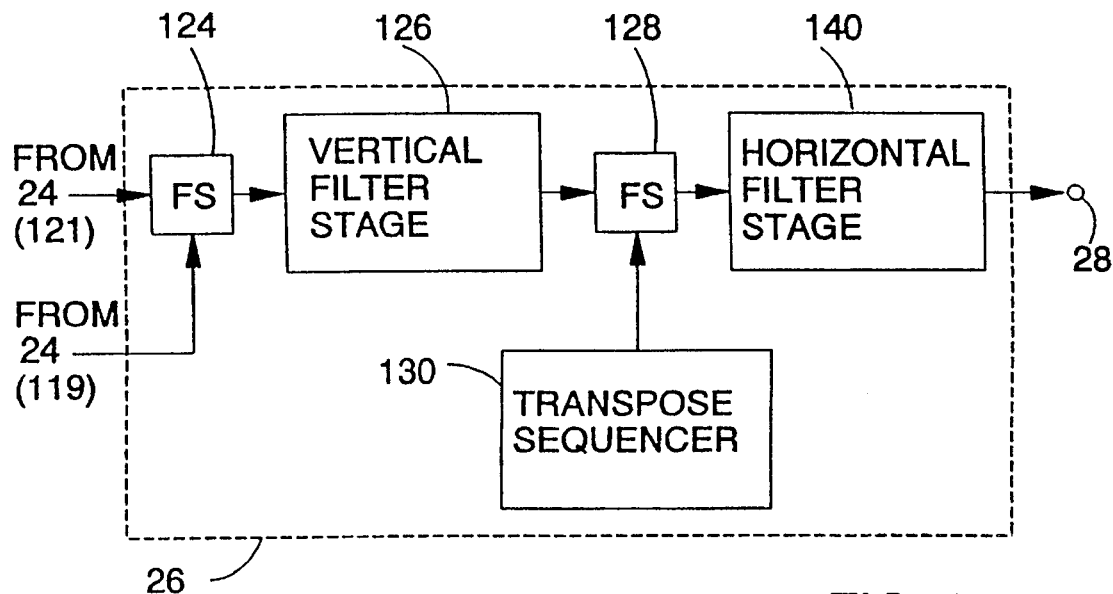
FIG. 14 is a schematic illustration of a two-dimensional sub-band interpolator.
Figure 15:
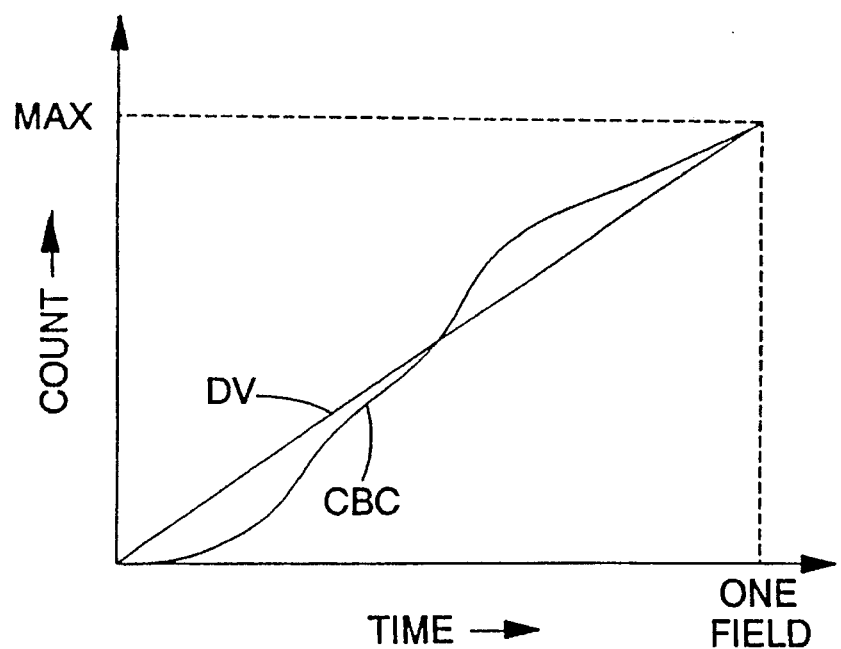
FIG. 15 illustrates the operation of the intra-block control technique within the compression encoder of FIG. 11.

The output of the compression decoder 22 is stored in a first field store 124 of an interpolator 26 (FIG. 14) under the control of a resequencer 24 (FIG. 15).

The resequencer 24 is implemented in substantially the same manner as the sequencer 14. FIG. 13 is a schematic block diagram of the resequencer 24. A sub-band scan counter (SBSC) 112 and sub-band scan look-up table (SBS LUT) 116 correspond to the SBSC 60 and SBS LUT 64 of the sequencer 14 and define the identity of successive sub-bands for which data is to be stored in the field memory 124. A sample scan counter (SSC) 114 corresponds to the SSC 62 of the sequencer 14 and generates successive counts for sequencing through the samples of a sub-band. The address 118 corresponds to the address logic 66 of the sequencer 14 and uses the outputs of the SBS LUT 116 and the SSC 114 to map logical sub-band and sample addresses as represented by the outputs of the SBS LUT 116 and SSC 114, respectively, into physical addresses for addressing the field store 124 for storing the decompressed samples. The physical addresses are output at 119 from the address logic 118. The data for storage in the field store 124 is passed from the compression decoder 22 via path 121. The resequencer also supplies signals at an output 120 to the compression decoder indicating the sub-band to which the current sample for storage relates. The signals from the output 120 are used to select appropriate dequantisation values for respective sub-bands from the dequantisation tables in the compression decoder.

FIG. 14 illustrates an example of an interpolator 26 complementary to the decorrelator 12. The interpolator 26 mirrors the decorrelator 12 in structure and in operation, with a first field store 124, a vertical filter stage 126, an intermediate field store 128, a transpose sequencer 130 and a horizontal filter stage 140. Each of the vertical and horizontal filter stages can be implemented as the tree structure to the right of the dashed line 36 in FIG. 4. The restored decompressed and interpolated video image is output at 28.

The operation of the intra-block technique within the compression encoder 16 is illustrated by FIG. 15, which gives an example of a variation in the output of the desired occupancy indicator 78 as a straight line DV and the corresponding compressed bit count CBC of the compressed bit counter 80. In FIG. 15, it can be seen that a desired value (DV) increases at a constant rate. Although the input bit rate is constant, the input information rate will not necessarily also be constant. Here it is assumed that the first part of the block was not particularly information dense (e.g. corresponding, for example to a blue sky in the upper part of an image) with the result that, the degree of compression achieved is above target for a given quantisation factor $Q_s$ and the corresponding rate of increase in the compressed bit count is lower than expected. Conversely, in the later portion of the block, the information content was rather higher (e.g. corresponding to a foreground in the lower part of an image) and a larger number of compressed bits will be generated for a given quantisation factor $Q_s$. In this way, the compressed bit count rate increases above the desired target value.

The desired values and the compressed bit counts on both the compression encoding apparatus of FIG. 10 and the compression decoding apparatus of FIG. 12 as represented in FIG. 15 track each another. At the same point through a block during either compression or decompression identical values will be present in the desired values and compressed bit counts. If the PROMs 84 and 106 on each side contain the same maps, then since they are fed with the same inputs they will produce the same quantisation factor. In this way the system applies exactly the same scale factor during dequantisation as were used to compress those bits during quantisation.

However, although the variations in quantisation factor achieved by the compression encoder of FIG. 10 and the decompression encoder of FIG. 12 enable changes in information content to be accommodated, the effect of the process is that unnecessary numbers of bits within the block may be used to represent an area (e.g. the sky) in the upper part of the image which might better have been used to represent the detail of the foreground. Unfortunately, many images do not have an even distribution of information content. Typical landscapes, for example, have less information content in the upper part of the image than in the lower part. In other words, where, as previously proposed the intra-sub-band scanning of the sub-bands is performed in a raster type manner from top to bottom, a balanced compression of over the image is often not achieved.

The present invention enables this problem to be overcome while retaining the advantages of a compression encoder and decoder arrangement as described with reference to FIGS. 10 and 12.

In a compression processing apparatus in accordance with the invention, the raster style scanning order previously proposed and described with reference to FIG. 8 is replaced with a scanning order in which successively accessed samples within a sub-band are scattered within the sub-band. This can be achieved by applying a pseudo-random mapping to the output of the sample scanning counter SSC 62 of FIG. 9.

The use of a pseudo-random mapping or other mapping in which the location of successively accessed samples within a sub-band are distributed within that sub-band means that the variation of the quantisation factor $Q_s$ over a block from the average value for the block will be less with the previously proposed sample scanning approach and accordingly less information will be lost as a result of the quantisation operation.

Figure 16:
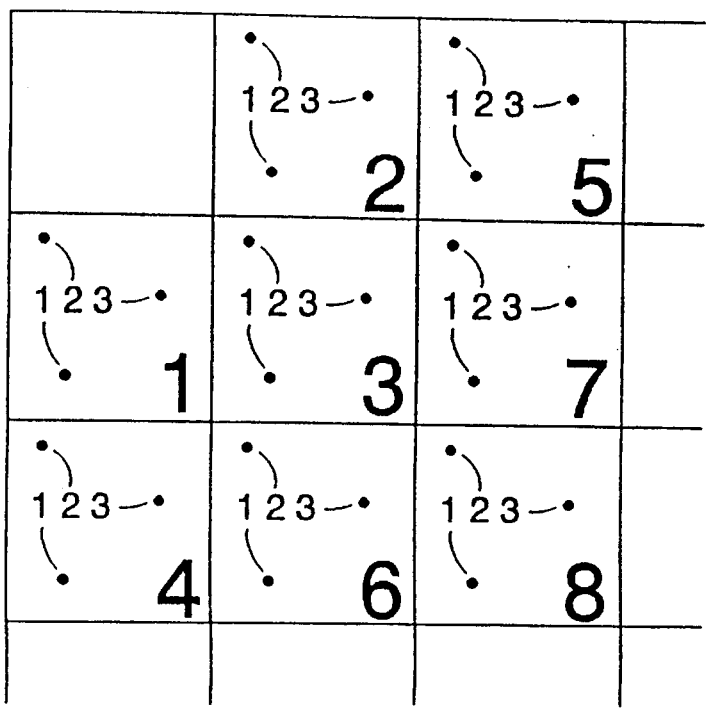
FIG. 16 illustrates in detail the order of scanning samples in accordance with the invention.

FIG. 16 illustrates one example of an order of scanning samples in accordance with the invention. As before, the DC luminance information and DC chrominance information sub-bands can be intra-sub-band scanned and fed to the entropy encoder 16 of FIG. 1, and the data from the remaining sub-bands are inter-sub-band scanned out to the entropy encoder 20 in the order shown in FIG. 7 (i.e. in order of increasing AC spatial frequency). In other words, the basic scanning pattern of FIG. 7 is performed in a plurality of passes, with a sample being accessed on each pass, whereby a plurality of passes equal to the number of samples per sub-picture is necessary in order to access all samples.

However, the individual samples are scanned with, in a first pass, the sample labelled in FIG. 16 with a small "1" being accessed in each sub-picture in the order represented by the larger numerals 1, 2, 3, 4, etc. In a second pass, the sample identified in FIG. 16 with a small, "2" in each sub-picture is accessed, in the order represented by the larger numerals 1, 2, 3, 4, etc. In a third pass the sample identified in FIG. 16 by a small "3" in each sub-picture is accessed in the same order. This process continues with samples accessed from locations within a sub-band in accordance with a pseudo-random sequence until all the samples have been accessed. It will be noted from FIG. 16 that successive samples are taken from locations scattered or distributed throughout a sub-band. This sequence cannot be truly random as it is necessary to generate the same sequence on decompressing the block of data in order to be able to restore the original input data. It can be generated, for example, by using a pseudo random number generator to actually generate the addresses, or, for example, by storing values in accordance with a pseudo-random sequence in a look-up table and then using the count of a counter to sequentially access the locations in the look-up table containing the pseudo-random numbers.

Figure 17:
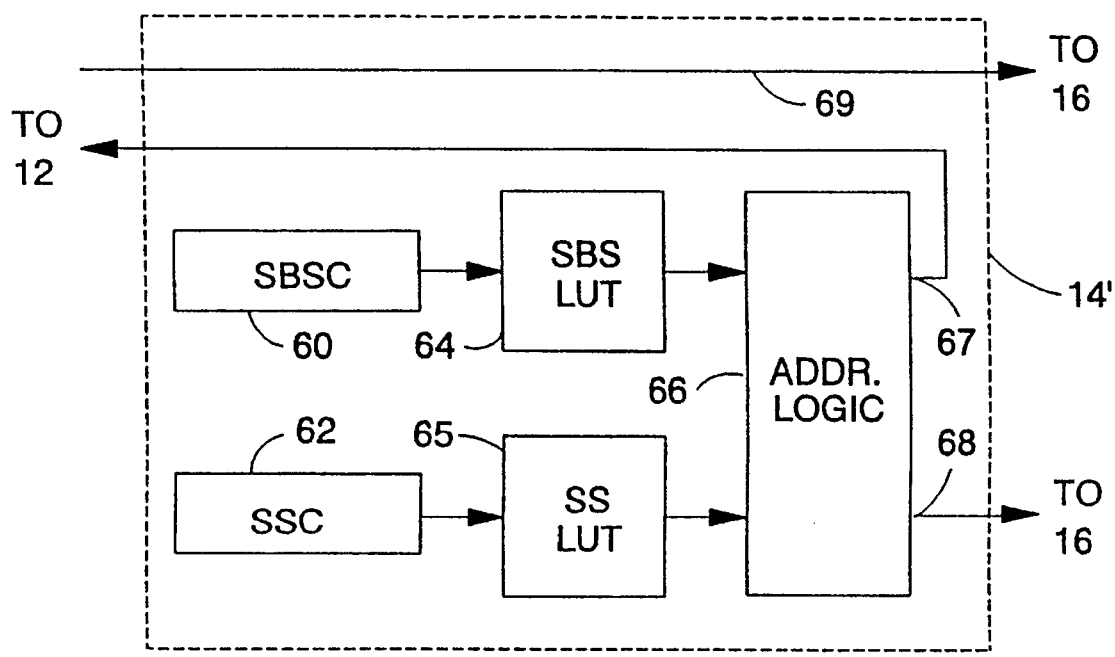
FIG. 17 is a schematic illustration of an example of a sequencer for scanning the AC spatial frequency components as shown in FIG. 13.

FIG. 17 is a schematic block diagram of an example of a sequencer 14' which can be employed instead of the sequencer 14 in the compression processing apparatus of FIG. 1 in order to provide an example of the present invention. The sequencer 14' illustrated in FIG. 17 comprises first and second counters 60 and 62. A sub-band scan counter (SBSC) 60 is used to control the scanning of the sub-bands in the order illustrated in FIG. 7. The output of the counter 60 is used to address a sub-band scan look-up table (SBS LUT) 64 in successive storage locations of which the identity of successive sub-bands in the order illustrated in FIG. 7 are stored. The successive sub-band identities are passed to address logic 66. A sample scan counter (SSC) 62 generates successive counts for sequencing through the samples of a sub-band. However, rather than applying the output of the SSC 60 directly to the address logic 66, the output of the counter is supplied to a sample scan look-up table (SS LUT) 65 which contains data for defining a pseudo-random sequence in successively addressable locations for accessing all of the samples of a sub-band in a pseudo-random order. The SS LUT 65 thus provides a pseudo-random mapping of the counts from the SSC 62. The successive values output from the SS LUT 65 are input to the address logic 66. The address logic 66 uses the outputs of the SBS LUT 64 and the SS LUT 65 to generate addresses for accessing the field store 58 of the decorrelator 12 to extract the sample data in the desired, pseudo-randomised order.

Preferably the same pseudo-random sequence is to be used for each of the sub-bands of a data block, as this simplifies the implementation of the invention, in that only a relatively small look-up table is required for the SS LUT 65. Also, as in the decorrelated sub-bands the information at corresponding locations within a sub-band relate to the same area of the original image, selecting corresponding sub-band locations in each sub-band improves the efficiency of the run-length encoding.

If inter-sub-band scanning is employed, then the SBSC 60 is incremented by a scanning clock (not shown) once per sample to be accessed, with the SSC being incremented once per pass (i.e. after the SBSC has been incremented a number of times equal to the number of AC sub-bands).

The sequencer 14' could also be used for intra-sub-band scanning by incrementing the SSC 62 by a scanning clock (not shown) once pep sample to be accessed and incrementing the SBSC 60 once per sub-band (i.e. after the SSC has been clocked by a number of times equal to the number of samples per sub-band).

The data accessed by the sequencer 14' is passed, in time multiplexed manner, via path 69 to the compression encoder 16 for further processing. The sequencer also supplies signals at an output 68 to the compression encoder 16 indicating the sub-picture (sub-band) to which each sample currently output from the output field store 58 relates.

The other elements of a compression processing apparatus in accordance with the invention can have the form and structure described above with reference to FIGS. 1, 3 to 7 and 10.

Figure 18:
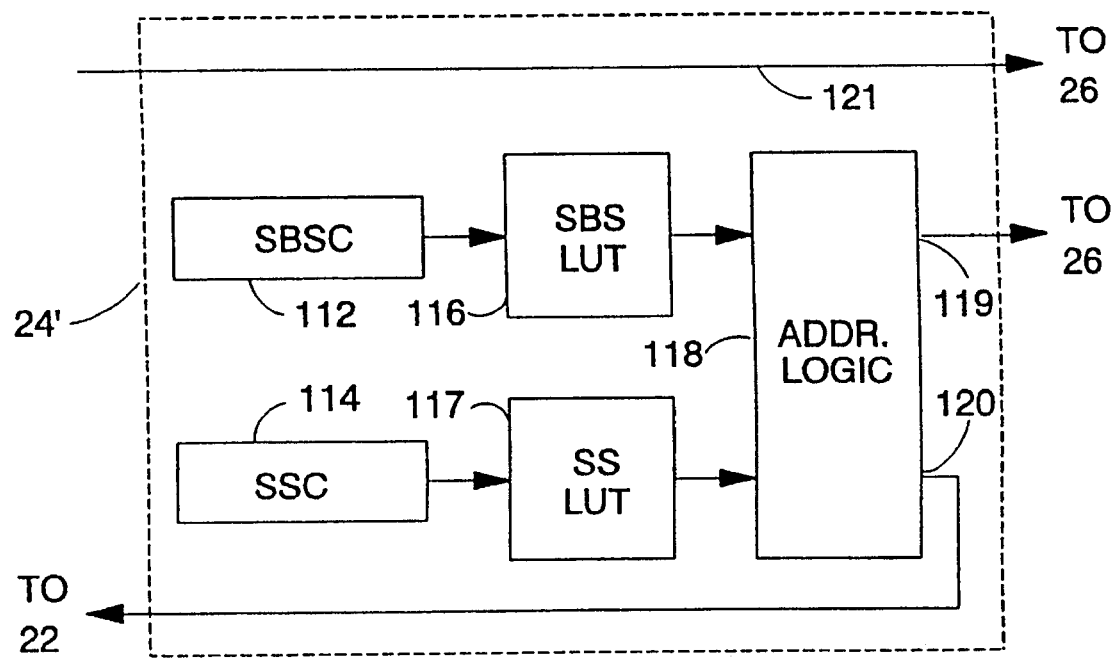
FIG. 18 is a schematic illustration of an example of a resequencer complementary to the sequencer of FIG. 17.

Likewise, a decompression processing apparatus in accordance with the invention can have the form and structure generally described above with reference to FIGS. 2 to 7, 12 and 14 with a resequencer 24' having the form and construction as illustrated in FIG. 18. It will be noted that the resequencer 24' illustrated in FIG. 18 corresponds generally to the resequencer 24 illustrated in FIG. 13, but with the addition of a sample scan look-up table (SS LUT) 117 which corresponds to the SS LUT 65 of the sequencer 14' shown in FIG. 17. The SS LUT 117 of the resequencer 24' is the same as the SS LUT 65 in the sequencer 14' so that scanning order can be matched at the decompression stage to that applied at the compression stage. It will be appreciated that the operation of the resequencer 24 ' corresponds to that of the sequencer 14' for intra-sub-band or inter-sub-band scanning as appropriate, by suitably controlling the clocking of the counters 112 and 114. As the operation of the sequencers 14 and 14' For intra- and inter-sub-band scanning was described in detail above, this description will not be repeated here.

There has been described an example of compression and decompression apparatus which enables more effective compression of data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

For example, if the invention is intended to be used in an application where a storage medium is used for the compressed data which is susceptible to error, error correction techniques could be employed. For example, the header inserter of a compression processing apparatus could be employed in a known manner to add error correction data to blocks of compressed data for storage. The header reader of a corresponding decompression processing apparatus could be employed in a known manner to attempt error correction on the basis of the stored error correction information. Known techniques for the concealment of errors could also be employed.

Also, although the invention has been described with reference to the processing of composite video images, the invention is also applicable to image processing systems which process image data in component form. In such an apparatus it would be necessary to duplicate elements of the apparatus of FIGS. 1 and 2 for separate processing of the chrominance and luminance data, for example, as will be appreciated by one skilled in the art.

Indeed, although the invention has been specifically described in the context of apparatus for compressing and decompressing image data, it will be appreciated that the invention is also applicable to the compression and decompression of other types of data.

We claim:

1. A signal processing system comprising:

data compression means for compressing an input block of data samples including a plurality of sub-blocks, each sub-block including an array of data samples, into a block of compressed data; and sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed, wherein said sequencing means sequentially accesses said sub-blocks in said first order a number of passes equal to the number of data samples per sub-block and with one data sample per sub-block being selected on each pass, the location of said data sample selected from each sub-block on successive passes being determined in accordance with said pseudo-random order.

2. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

a counter for generating N successive counts, where N is a number of data samples per sub-block; and mapping means defining a mapping for successive counts in accordance with said pseudo-random order for accessing data samples within a sub-block, wherein said sequencing means sequentially accesses sub-blocks in said first order a number of passes equal to a number of data samples per sub-block with a count of said counter being incremented once per pass.

3. A system according to claim 2 wherein said sequencing means sequentially accesses sub-blocks in said first order with said counter being incremented N times per sub-block.

4. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

a counter for generating N successive counts, where N is a number of data samples per sub-block; and mapping means defining a mapping for successive counts in accordance with said pseudo-random order for accessing data samples within a sub-block, wherein said mapping means is a look-up table, an input to which is connected to an output of said counter, whereby a count output from said counter addresses a location in said look-up table defining said sub-block data sample location corresponding to said position within the pseudo-random order.

5. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed, wherein said compression means comprises a quantiser for applying a dynamically variable degree of quantisation to a block of input data samples to control a size of said block of compressed data to be substantially equal to a predetermined size;

storage means for storing a block of compressed data and a compressed bit counter for counting bits written to said storage means for a block of compressed data;

a desired occupancy indicator for providing an indication of a number of bits quantised for each input block; and a quantisation controller responsive to said desired occupancy indicator and said compressed bit counter for determining what degree of quantisation said quantiser should apply to subsequent bits of said input block to control a size of said blocks of compressed data to be substantially equal to said predetermined size, and wherein said quantiser applies a degree of quantisation determined by said quantisation controller to said subsequent bits of said input block.

6. A system according to claim 5, further comprising an accumulator storing a value indicative of an average degree of quantisation applied to a current input block, and a latch for reading said accumulator at an end of compression of each input block and serving as source of a base degree of quantisation to be applied to a subsequent input block.

7. A system according to claim 6 comprising means for generating a header for a block of compressed data, said header including information defining a base degree of quantisation applied for that block.

8. A signal processing system comprising:

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and said data samples within each sub-block being addressed in a predetermined pseudo-random order such that successively addressed locations in said array of samples for a sub-block are scattered throughout that sub-block and such that the order in which any one data sample is accessed cannot be predicted from the order in which other data samples in that sub-block are accessed, wherein said resequencing means sequentially addresses sub-blocks in said first order a number of passes equal to a number of data samples per sub-block and with one data sample per sub-block being addressed on each pass, a location of a data sample addressed in each sub-block on successive passes being determined in accordance with said pseudo-random order.

9. A signal processing system comprising:

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and said data samples within each sub-block being addressed in a predetermined pseudo-random order such that successively addressed locations in said array of samples for a sub-block are scattered throughout that sub-block and such that the order in which any one data sample is accessed cannot be predicted from the order in which other data samples in that sub-block are accessed, wherein said resequencing means comprises a resequencer counter for generating N successive counts, where N is a number of data samples per sub-block, and mapping means for defining a mapping for successive counts in accordance with a pseudo-random order for accessing data samples within a sub-block, wherein said resequencing means sequentially addresses sub-blocks in said first order a number of passes equal to a number of data samples per sub-block with a count of the resequencer counter being incremented once per pass.

10. A system according to claim 9 wherein said resequencing means sequentially addresses sub-blocks in said first order with said resequencer counter being incremented N times per sub-block.

11. A signal processing system comprising:

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and said data samples within each sub-block being addressed in a predetermined pseudo-random order such that successively addressed locations in said array of samples for a sub-block are scattered throughout that sub-block and such that the order in which any one data sample is accessed cannot be predicted from the order in which other data samples in that sub-block are accessed, wherein said resequencing means comprises a resequencer counter for generating N successive counts, where N is a number of data samples per sub-block, and mapping means for defining a mapping for successive counts in accordance with a pseudo-random order for accessing data samples within a sub-block, wherein said mapping means of said resequencing means is a resequencer look-up table, an input to which is connected to an output of said resequencer counter, and a count output from said resequencer counter addresses a location in said resequencer look-up table defining a sub-block data sample location corresponding to a position within the pseudo-random order.

12. A signal processing system comprising:

data decompression means for decompressing a block of compressed data samples to form an output block of data samples which comprises a plurality of sub-blocks, each sub-block including an array of data samples;

storage means for storing a block of compressed data and a compressed bit counter for counting bits read from said storage means for a block of compressed data;

resequencing means for addressing storage locations for storage of data samples from said decompression means with said sub-blocks being addressed in a predetermined first order and said data samples within each sub-block being addressed in a predetermined pseudo-random order such that successively addressed locations in said array of samples for a sub-block are scattered throughout that sub-block and such that the order in which any one data sample is accessed cannot be predicted from the order in which other data samples in that sub-block are accessed;

said decompression means including a dequantiser for applying a dynamically variable degree of dequantisation to a block of compressed data to form a block of data samples;

a desired occupancy indicator for providing an indication of a number of bits dequantised for each compressed data block; and a dequantisation controller responsive to said desired occupancy indicator and said compressed bit counter for determining what degree of dequantisation said dequantiser should apply to subsequent bits of said compressed data block to regenerate said block of data samples and wherein said dequantiser applies a degree of dequantisation determined by said dequantisation controller to subsequent bits of said compressed data block.

13. A signal processing system comprising:

data decompression means for decompressing a block of compressed data samples to form an output block of data samples which comprises a plurality of sub-blocks, each sub-block including an array of data samples;

storage means for storing a block of compressed data and a compressed bit counter for counting bits read from said storage means for a block of compressed data;

resequencing means for addressing storage locations for storage of data samples from said decompression means with said sub-blocks being addressed in a predetermined first order and said data samples within each sub-block being addressed in a predetermined pseudo-random order such that successively addressed locations in said array of samples for a sub-block are scattered throughout that sub-block and such that the order in which any one data sample is accessed cannot be predicted from the order in which other data samples in that sub-block are accessed, said decompression means including a dequantiser for applying a dynamically variable degree of dequantisation to a block of compressed data to form a block of data samples; and means for extracting a value from a header of a current compressed data block indicative of a base degree of quantisation which was applied in order to generate said current compressed data block, and a quantisation factor latch for storing said value indicative of a base degree of quantisation for said current compressed data block.

14. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block, wherein the resequencing means sequentially addresses sub-blocks in said first order a number of passes equal to a number of data samples per sub-block and with one data sample per sub-block being addressed on each pass, a location of a data sample addressed in each sub-block on successive passes being determined in accordance with said pseudo-random order.

15. A signal processing system comprising:

data compression means for compressing an input block of data samples including a plurality Of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block, wherein said resequencing means sequentially addresses sub-blocks in said first order with all data samples of a sub-block being addressed in accordance with said pseudo-random order before a next sub-block is addressed in accordance with said first order.

16. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block, wherein said resequencing means comprises a resequencer counter for generating N successive counts, where N is a number of data samples per sub-block, and mapping means for defining a mapping for successive counts in accordance with a pseudo-random order for accessing data samples within a sub-block.

17. A system according to claim 16 wherein said resequencing means sequentially addresses sub-blocks in said first order a number of passes equal to a number of data samples per sub-block with a count of the resequencer counter being incremented once per pass.

18. A system according to claim 17 wherein said resequencing means sequentially addresses sub-blocks in said first order with said resequencer counter being incremented N times per sub-block.

19. A system according to claim 16 wherein said mapping means of said resequencer is a resequencer look-up table, an input to which is connected to an output of said resequencer counter, and a count output from said resequencer counter addresses a location in said resequencer look-up table defining a sub-block data sample location corresponding to a position within the pseudo-random order.

20. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

storage means for storing a block of compressed data and a compressed bit counter for counting bits read from said storage means for a block of compressed data;

data decompression means for decompressing a block of compressed data samples to form an output block of data samples which comprises a plurality of sub-blocks, each sub-block including an array of data samples;

resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block, said decompression means including a dequantiser for applying a dynamically variable degree of dequantisation to a block of compressed data to form a block of data samples;

a desired occupancy indicator for providing an indication of a number of bits dequantised for each compressed data block; and a dequantisation controller responsive to said desired occupancy indicator and said compressed bit count for determining what degree of dequantisation said dequantiser should apply to subsequent bits of said compressed data block to regenerate said block of data samples and wherein said dequantiser applies a degree of dequantisation determined by said dequantisation controller to subsequent bits of said compressed data block.

21. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

storage means for storing a block of compressed data and a compressed bit counter for counting bits read from said storage means for a block of compressed data;

data decompression means for decompressing a block of compressed data samples to form an output block of data samples which comprises a plurality of sub-blocks, each sub-block including an array of data samples;

resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block;

said decompression means including a dequantiser for applying a dynamically variable degree of dequantisation to a block of compressed data to form a block of data samples;

means for extracting a value from a header of a current compressed data block indicative of a base degree of quantisation which was applied in order to generate said current compressed data block; and a quantisation factor latch for storing said value indicative of a base degree of quantisation for said current compressed data block.

22. A signal processing system comprising:

data compression means for compressing an input block of data samples including a plurality of sub-blocks, each sub-block including an array of data samples, into a block of compressed data;

sequencing means for accessing said data samples of said input block to be passed to said data compression means with said sub-blocks being accessed in a predetermined first order and data samples within each said sub-block being accessed in a predetermined pseudo-random order such that successively accessed locations in said array of data samples for a sub-block are scattered throughout that sub-block and such that the order in which any one data sample is accessed cannot be predicted from the order in which other data samples in that sub-block are accessed;

data decompression means for decompressing a block of compressed data samples to form an output block of data samples which comprises a plurality of sub-blocks, each sub-block including an array of data samples; and resequencing means for addressing storage locations for storage of data samples from said decompression means with said sub-blocks being addressed in a predetermined first order and input data samples within each sub-block being addressed in a predetermined pseudo-random order such that successively addressed locations in said array of samples for a sub-block are scattered throughout that sub-block, wherein said output block is a decorrelated output image, each sub-block comprising a decorrelated sub-image, said image processing system comprising means for interpolating said decorrelated output image to generate an output image.

* * * * *